UNITED STATES PATENT OFFICE.

THOMAS E. MURRAY, OF NEW YORK, N. Y.

METHOD OF WELDING THE BUTT-END OF A TUBE TO A PLATE OF THIN METAL HAVING AN OPENING.

1,270,045.   Specification of Letters Patent.   Patented June 18, 1918.

Application filed November 1, 1917. Serial No. 199,777.

*To all whom it may concern:*

Be it known that I, THOMAS E. MURRAY, a citizen of the United States, residing at New York, in the county of New York and State of New York, have invented a certain new and useful Improvement in Methods of Welding the Butt-End of a Tube to a Plate of Thin Metal Having an Opening, of which the following is a specification.

The invention is a method of welding the butt end of a tube to a plate of thin metal having an opening, wherewith the longitudinal axis of said tube is to be concentric, and also the product of said method. By thin metal I mean sheet metal of such thinness as that a current which will weld the butt end of the tube to the plate will also be strong enough to melt the metal of said plate at the joint, so that said metal will escape, leaving openings around the joint periphery.

My method consists in providing additional metal around the opening and welded to one side of the plate, whereby the mass of metal at the joint is greatly increased, and, as will be hereafter explained, the objectionable burning of the metal of the plate prevented.

In the accompanying drawings—

Figure 1:
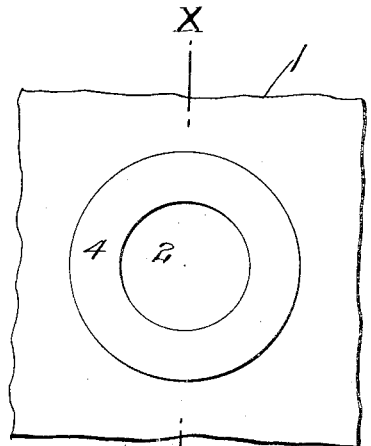
Figure 3:
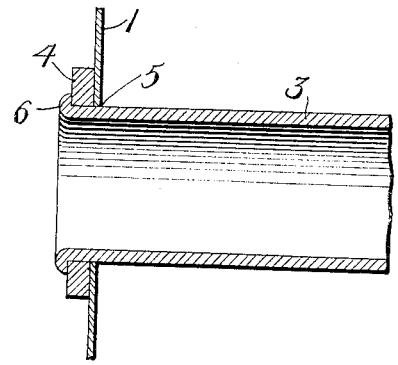
Figure 2:
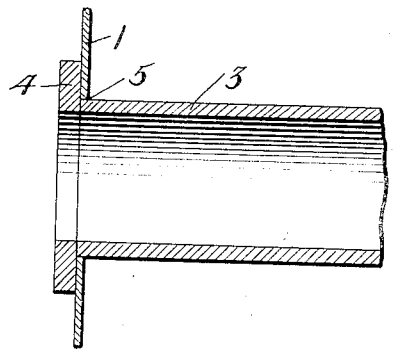
Figure 4:
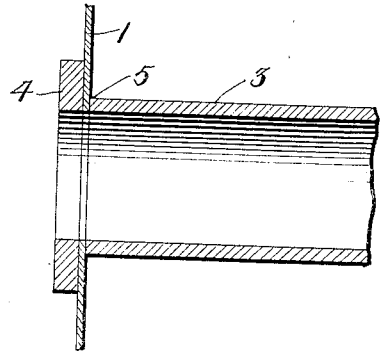

Figure 1 is a plan view of a plate having a circular opening, with my reinforcing ring in place. Figs. 2, 3 and 4 are sections on the line X, X of Fig. 1, showing three modes of uniting the tube to the plate and reinforcing ring.

Similar numbers of reference indicate like parts.

1 is a relatively thin plate of metal having a circular opening 2, to which plate at said opening the end of tube 3 is to be secured by electric welding. Where the metal is thin, it is liable, as above stated, to be quickly melted at the joint, so that openings or perforations occur around the joint, which practically destroy the integrity of the union. This I prevent by welding to the plate 1, concentrically with the opening 2, a metal ring 4 of a thickness largely to increase the mass of metal around said opening. The results then are as follows:

In the form shown in Fig. 2, if the ring 4 were absent, the sole joint would be at 5, and the thin metal of plate 1 immediately surrounding the tube 3 would quickly become burned and melted by a welding current. On the other hand, with the ring 4 present, two joints relatively at right angles are produced; one between the butt end of tube 3 and the ring 4, which is here placed to form a shoulder in opening 2, and another, as already stated, at 5. Both the welding area and the mass of metal thereat is thus largely increased, and the current is no longer concentrated only in said joint 5. The welding is then easily performed without danger of injury at the joint.

In the form shown in Fig. 3, the inner circumference of the ring 4 corresponds to the opening 2. If said ring were not present, the metal plate 1, as before, would be burned and fused around the joint 5. With the ring present, as shown, the tube may be passed through both ring and plate, and expanded, as represented at 6. Here, while the welding area of the ring remains the same, not only is the mass of metal around the joint increased, but a portion of the welding current passes through the joint between ring 4 and tube 3, so that the remainder which traverses the joint between plate 1 and tube 3 is not of sufficient strength to act destructively on the metal of the ring.

In Fig. 4, with the ring absent and the butt end of the tube 3 in contact with the plate 1 so as to inclose the circumferential edge of opening 2, the passage of the current at joint 5 would burn off said circumferential edge. But with the ring present as shown, there is an abundant mass of metal around the joint to take heat from the current, and so prevent the burning aforesaid.

I claim:

1. The method of securing the butt end of a tube to a plate of thin metal having an opening wherewith the longitudinal central axis of said tube is concentric, which consists in, first, electrically welding a ring of metal to said plate surrounding and concentric with said opening, and second, electrically welding said tube to said united plate and said ring.

2. The method of securing the butt end of a tube to a plate of thin metal having an opening wherewith the longitudinal central axis of said tube is concentric, which consists in, first, electrically welding a ring of metal of less inner diameter than said opening to said plate and concentrically with said opening to form a shoulder therein; second, inserting the butt end of said tube into said opening to bear against said shoulder, and third, electrically welding said tube to said united plate and ring.

3. A plate of sheet metal having an opening, a mass of metal welded to said plate and surrounding said opening, and a tube having its longitudinal axis concentric with said opening and electrically welded to said united plate and mass.

In testimony whereof I have affixed my signature in presence of two witnesses.

THOMAS E. MURRAY.

Witnesses:
GERTRUDE T. PORTER,
MAY T. McGARRY.